(12) United States Patent
Bollo et al.

(10) Patent No.: US 7,109,994 B2
(45) Date of Patent: Sep. 19, 2006

(54) SEQUENCING INPUT CONTROL STICK

(75) Inventors: David Bollo, Richmond (CA); Todd Batty, Vancouver (CA); Sean O'Brien, Vancouver (CA)

(73) Assignee: Electronic Arts, Inc., Redwood City, CA (US)

( * ) Notice: Subject to any disclaimer, the term of this patent is extended or adjusted under 35 U.S.C. 154(b) by 0 days.

(21) Appl. No.: 10/441,368

(22) Filed: May 20, 2003

(65) Prior Publication Data

US 2004/0233199 A1    Nov. 25, 2004

(51) Int. Cl.
*G06T 13/00* (2006.01)
(52) U.S. Cl. .................. 345/473; 345/161; 345/162; 463/38
(58) Field of Classification Search .......... 345/473, 345/161–162, 419; 463/38; 700/83
See application file for complete search history.

(56) References Cited

U.S. PATENT DOCUMENTS

| | | | | |
|---|---|---|---|---|
| 6,288,705 | B1* | 9/2001 | Rosenberg et al. | 345/157 |
| 2002/0151992 | A1* | 10/2002 | Hoffberg et al. | 700/83 |
| 2003/0126035 | A1* | 7/2003 | Kake et al. | 705/26 |

* cited by examiner

*Primary Examiner*—Kimbinh T. Nguyen
(74) *Attorney, Agent, or Firm*—Townsend and Townsend and Crew LLP

(57) ABSTRACT

A method of controlling an animation character with a controller that includes determining a position of the controller and determining a current state of the animation character. A history of positions of the controller is determined and compared with a set of history patterns based upon the current state of the animation character. An animation sequence is initiated based upon any matched history patterns.

26 Claims, 3 Drawing Sheets

SEQUENCING INPUT CONTROL STICK

BACKGROUND OF THE INVENTION

1. Field of the Invention

The present invention relates to systems and methods for a stick-type controller, and more particularly, to systems and methods for controlling an animation character based upon a history of positions of the control stick.

2. Description of the Prior Art

Many animation sequences, such as, for example, games, educational activities, interactive storytelling, interactive moving watching, etc., involve the use of some type of input device. These input devices may include keyboards, computer mice, track balls, and joysticks. With these input devices, animation characters or sequences may be controlled in a variety of ways.

With controllers commonly referred to as joysticks, the character or characters may be moved by moving the joystick in various directions and positions. By pressing a single button, or possibly a combination of buttons, an animation sequence may be triggered. However, there are generally numerous possibilities based upon the current state of the animation activity. Thus, by simply pressing a button or combination of buttons, there is no predictable way for a user to initiate a specified animation in a desired situation. Thus, it is generally left to chance or randomness.

SUMMARY OF THE INVENTION

The present invention provides a method of controlling an animation character with a controller that includes determining a position of the controller and determining a current state of the animation character. A history of positions of the controller is determined and compared with a set of history patterns based upon the current state of the animation character. An animation sequence is initiated based upon any matched history patterns.

In accordance with one aspect of the present invention, the animation sequence is initiated based upon a first matched history pattern.

In accordance with another aspect of the present invention, the history of positions is compared with the set of history patterns in a predetermined order.

In accordance with a further aspect of the present invention, the method further includes determining an amount of time the controller spent in each position for the history of positions and including the amount of time in the comparison.

In accordance with another aspect of the present invention, the amount of time is characterized as one of either long or short.

In accordance with yet another aspect of the present invention, long is defined as greater than or equal to one second.

In accordance with a further aspect of the present invention, short is defined as less than or equal to one second.

In accordance with yet a further aspect of the present invention, positions are classified within one of five zones.

In accordance with another aspect of the present invention, the controller comprises a control stick and these zones are classified as up, down, left, right and center.

In accordance with a further aspect of the present invention, the method further includes applying hysteresis to edges along the zone such that if the controller was previously in a first zone and is now along an edge of the first zone and a second zone, the controller is still deemed to be within the first zone even if it is actually in the second zone or directly on the edge.

In accordance with a further aspect of the present invention, if no history pattern is matched, then control of the animation character is automatically handled by a central controller.

In accordance with yet another aspect of the present invention, the animation sequence comprises a sequence of moves.

In accordance with yet a further aspect of the present invention, the animation sequence comprises a single move.

The present invention also provides a system for executing animation sequences. The apparatus includes a central controller and a display communicatively coupled to the central controller. At least one controller is communicatively coupled to the central controller. Storage is provided within the central controller for storing a history of positions of the controller. Additionally, storage is provided within the central controller for storing a set of history patterns based upon possible states of an animation character. Processing means is also provided within the central controller for comparing the history of positions with the set of history patterns and determining a state for the animation character based upon a current state of the animation character and any matched history patterns.

Thus, the present invention provides systems and methods for controlling an animation character with a controller based upon positions of the controller. The system allows the user to trigger exact moves at exact times that he or she desires. The result is a dynamic control system that allows the user to minimize randomness within game-playing strategy and express themselves individually through learning and manipulating the controller in any manner he or she sees fit.

Other features and advantages of the present invention will be apparent in view of the following detailed description of preferred exemplary embodiments.

DETAILED DESCRIPTION OF THE INVENTION

Figure 1:
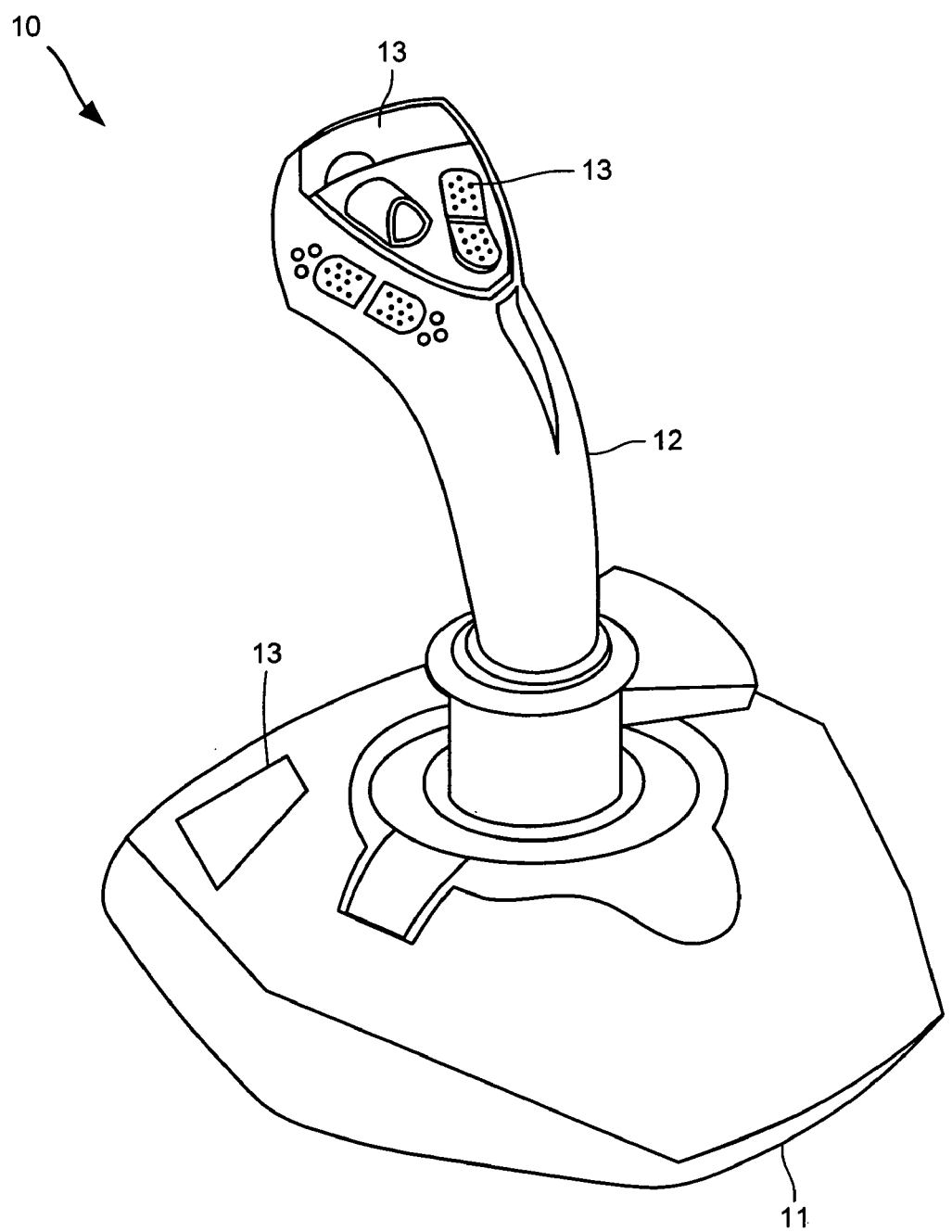
FIG. 1 is an illustration of an example of a general stick-type controller.

The present invention provides systems and methods for utilizing a stick-type controller for a game or animation-type interactive activity controlled by a central controller. Preferably the stick-type controller comprises an analog controller in the form of a control stick or "joy stick". FIG. 1 illustrates an example of a basic design for an analog stick controller 10. While the present invention will be described with reference to such an analog stick controller, those skilled in the art will understand that other types of controllers may be used, such as, for example, various types of directional pads, and that they may be analog or digital.

As can be seen in FIG. 1, the stick controller preferably includes a base 11 and a moveable or pivotable stick 12 coupled thereto. Input buttons 13 may be provided at various positions on the stick controller, for example, at various positions on the base or at various positions on the stick controller, such as at the top.

Figure 2:
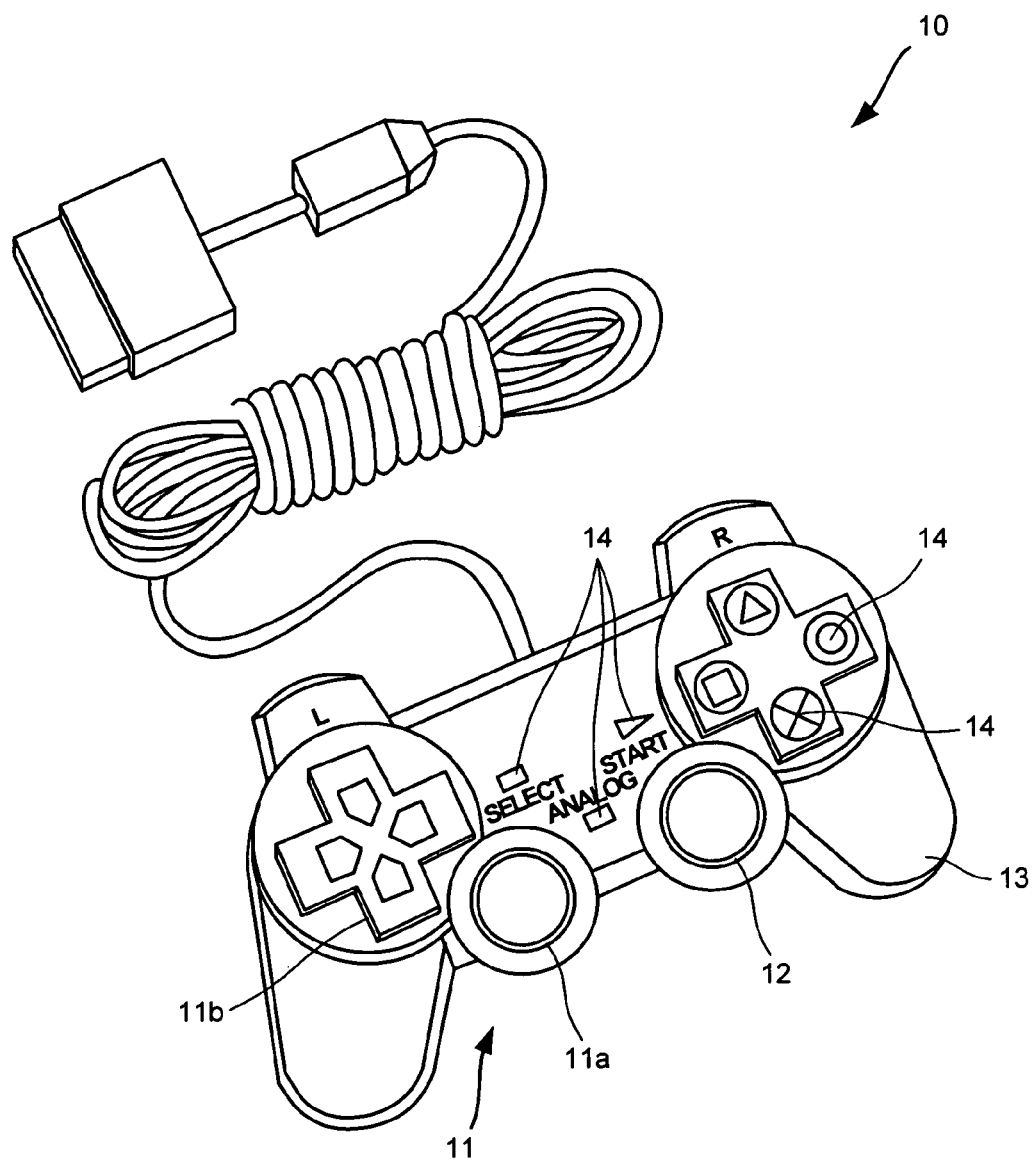
FIG. 2 is an illustration of another example of a controller.

As may be seen in FIG. 2, an example of a second type of controller 100 preferably includes a primary controller 111 and a pivotable stick controller 112. Primary controller 111 may include one or both of a pivotable stick controller 111a and a directional pad 111b. Controller 100 also includes a base 112 to which primary controller 111 and stick controller 112 are coupled. Input buttons 113 may be provided at various positions on the controller, for example, at various positions on the base or at various positions on the stick controller, such as at the top.

Those skilled in the art will understand that while the present invention is useful for controllers illustrated in FIGS. 1 and 2, as well as many other types of controllers that include a movable or pivotable controller, both analog and digital, or a combination of both.

Figure 3:
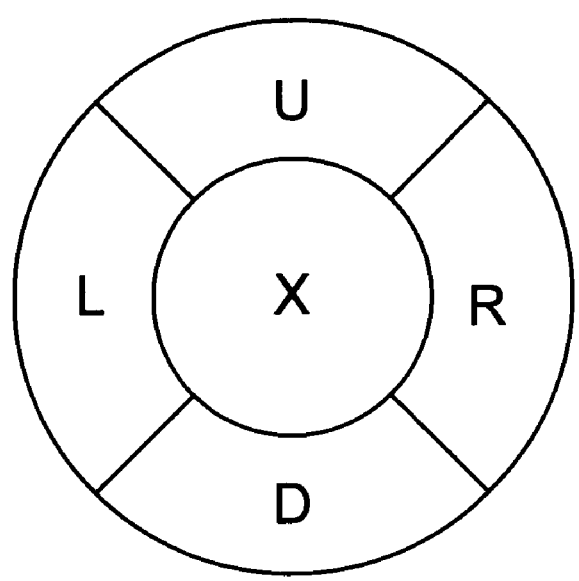
FIG. 3 is an illustration of possible zone definitions for a stick-type controller in accordance with the present invention.

In accordance with the present invention, the area that the pivotable stick may be positioned is broken up into zones. Preferably, there are five zones, of which one zone is in the center of the stick and four perimeter zones are provided around the center zone. An example of the perimeter zones includes four perimeter zones, specifically, left, right, up and down. FIG. 3 represents an example of mapping the zones relative to the base. As can be seen, a center zone X is provided along with four perimeter zones up U, down D, left L, and right R. Thus, the control stick is movable or pivotable into these five zones. Preferably, the control stick is biased to an upright position, i.e., the center zone.

In accordance with one preferred embodiment of the present invention, hysteresis is applied to the edges of the zones. Thus, if the stick was previously in the center zone X and now it is on the edge of the center zone, or actually even just past the edge, then the stick is deemed to be still within the current zone or, in this example, the center zone. Effectively, this makes the previous zone slightly larger so that if the stick is right on the edge of two or more zones, it will be biased towards the previous zone.

In accordance with the present invention, the position of the stick is monitored and this is referred to as the current zone. Additionally, the history of the stick position is also maintained. Thus, a current zone for the stick controller is combined with a history of zones that the stick has been in previously. Thus, with reference to FIG. 1, a zone history of XRD would indicate that the stick controller had moved from the center, to the right, and finally down. If the stick were then moved back to the center and then to the left, the history would then be XRDXL.

In accordance with a preferred embodiment of the present invention, in addition to tracking the sequence of moves through the zones, the present invention distinguishes between spending a short amount of time in a zone versus spending a long amount of time in a zone (which may be referred to as "holding" the zone state). Continuing the above example, a short amount of time in a zone is indicated with a suffix of "~", while a long amount of time in a zone is designated with a suffix of "'". Thus, if a user were to leave the stick controller idling in the center zone for a long amount of time and then move it quickly to the right zone, followed by holding the stick for a fair amount of time in the down zone, the pattern would be listed as X'R~D'. The boundary between a long amount of time and a short amount of time can vary depending on circumstances, such as one half second, one second, five seconds, etc. In a specific example, idling for one second or longer would be considered a long amount of time, while idling for less than one second would be considered a short amount of time. Meanwhile, preferably, if the stick were just moved into the right zone, the pattern would be R~, but after the stick was held there the requisite time, the pattern within the zone history would change to R'.

In an actual implementation, the zone numbers and times need not be represented by letters and symbols, but might be encoded more compactly. For example, they could be encoded into fewer bits (binary digits) with some machine words holding multiple values so that the history can be readily stored within the central controller.

Once zone histories have been determined, the present invention will determine if a new animation/action for an animation character should be initiated. This is achieved by examining the animation character's current animation/action state and comparing the stick controller's zone history to a set of patterns based on the particular current animation/action state. If a match is found, then it is determined what the new animation/action state should be for that history pattern from a lookup table within the central controller. The animation/action character is then changed or moved to a different current state. The preferred pattern matching allows the present invention to match sets of zone histories with a single pattern so that the pattern may test in a predetermined order and stop as soon as the first valid match is found. When a match is found and a new animation/action sequence is initiated, the zone history is cleared up to that particular point so that the same animation/action sequence is not repeated over and over and over while the stick is being held in a given zone.

As an example, consider that the animation/action is replicating a basketball game and that the animation/action character is a basketball player. Assume that . . . UL indicates to switch the ball into the player's left hand by moving the ball in front of the player's body; . . . DL requires to switch the ball into the player's left hand by moving the ball behind the player's body; and . . . L means switch the player's ball into the left hand by moving the ball in between the player's legs. In order to simplify the example, the amount of time for each position is being ignored. Additionally, the initial ellipsis in the pattern means that the preceding zones are irrelevant to the specific pattern (so . . . L matches any history that ends with L). With this example, even though all of the patterns end with the player holding the stick in the left hand zone, unique actions may be selected based on the history of the stick travel through the different zones. The above example also illustrates that the order of pattern matching is important. If the " . . . L" pattern had been first, it would have matched all patterns that end in "L", and thus it never would have been possible to make it to the " . . . UL" and " . . . DL" entries. Although it is not illustrated in the above example, the preferred inventive pattern matching system may also choose to play different animations based on whether the stick has been held in a zone for a long time or not.

Preferably, a fairly simple pattern matching algorithm is used. However, those skilled in the art will understand that it would be rather simple to extend the present invention to use more sophisticated algorithms (such as, for example, a regular-expression-based pattern matcher). The present invention's primary concept is to analyze the history of the zones as a pattern and select the animation/action based upon that history combined with the player's current animation/action state. Thus, there would be a different table used when the player's current animation/action state is "holding the ball" or "just completed moving the ball into the left hand by moving the ball in between the player's legs."

Preferably, animations/actions are not interrupted once they are started, and thus the user has time to move the stick around through a new sequence of zones while his previous action is being carried out. This means that as soon as the previous action is complete, the pattern matching process is repeated and if a match is found, a brand new animation/action sequence may be initiated. If no match is found, then the central controller preferably automatically handles the rest of the player's animations and actions.

It should be noted that although in most cases a triggered action is to just play single animation, this is not a requirement of the system. For example, in some situations, a sequence of moves (i.e., a history of zones) may initiate a complex game action (such as attempting a steal that involves playing one or more animation sequences as well as other game logic).

As previously mentioned, those skilled in the art will understand that while the present invention describes preferably using an analog stick-type controller, other types of movable or pivotable controllers may be used, either digital, analog or a combination of both.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of controlling an animation character with a controller, the method comprising:
    determining a position of the controller;
    determining a current state of the animation character;
    determining a history of discrete positions of the controller;
    comparing the history of discrete positions of the controller with a set of discrete history patterns based upon the current state of the animation character;
    determining whether the history of discrete positions matches at least one of the set of discrete history patterns; and
    initiating an animation sequence for execution by the animation character based upon any matched history patterns.

2. A method in accordance with claim 1 wherein the animation sequence is initiated based upon a first matched history pattern.

3. A method in accordance with claim 2 wherein the history of positions is compared.

4. A method in accordance with claim 1 further comprising determining an amount of time the controller spent in each position for the history of positions and including the amount of time in the comparison.

5. A method in accordance with claim 4 wherein the amount of time is categorized as one of either long or short.

6. A method in accordance with claim 5 wherein long is defined as greater than or equal to one second.

7. A method in accordance with claim 5 wherein short is defined as less than or equal to one second.

8. A method in accordance with claim 1 wherein discrete positions are classified within one of five zones.

9. A method in accordance with claim 8 wherein the controller comprises a control stick and the zones are classified as up, down, left, right and center.

10. A method in accordance with claim 1 wherein if no history pattern is matched, then control of the animation character is automatically handled by a central controller.

11. A method in accordance with claim 1 wherein the animation sequence comprises a sequence of moves.

12. A method in accordance with claim 1 wherein the animation comprises a single move.

13. A system for executing animation sequences, the system comprising:
    a central controller;
    a display communicatively coupled to the central controller;
    at least one controller communicatively coupled to the central controller;
    storage within the central controller for storing a history of discrete positions of the at least one controller;
    storage within the central controller for storing a set of discrete history patterns based upon possible states of an animation character; and
    processing means within the central controller for comparing the history of discrete positions with the set of history patterns and determining a state for the animation character based upon a current state of the animation character and any matched history patterns, and for initiating animation sequences for execution by the animation character based upon the determined state of the animation character.

14. A system in accordance with claim 13 wherein the controller comprises an analog controller.

15. A system in accordance with claim 13 wherein the controller comprises a digital controller.

16. A system in accordance with claim 13 wherein the controller comprises an analog and a digital controller.

17. A method of controlling an animation character with an analog controller, the method comprising:
    determining a discrete position of the analog controller, wherein positions are classified within one of five zones;
    determining a current state of the animation character;
    determining a history of discrete positions of the analog controller that led to the current state of the animation character;
    determining an amount of time the analog controller spent in each discrete position for the history of positions and including the amount of time in the history of discrete positions;
    comparing the history of discrete positions and times with a set of discrete history patterns based upon the current state of the animation character; and
    initiating an animation sequence for execution by the animation character based upon any matched history patterns.

18. A method in accordance with claim 17 wherein the animation sequence is initiated based upon a first matched history pattern.

19. A method in accordance with claim 18 wherein the history of positions is compared with the set of history patterns in a predetermined order.

20. A method in accordance with claim 17 wherein the amount of time is categorized as one of either long or short.

21. A method in accordance with claim 20 wherein long is defined as greater than or equal to one second.

22. A method in accordance with claim 20 wherein long is defined as greater than or equal to one second.

23. A method in accordance with claim 22 wherein the analog controller comprises a control stick and the zones are classified as up, down, left, right and center.

24. A method in accordance with claim 17 wherein if no history pattern is matched, then control of the animation character is automatically handled by a central controller.

25. A method in accordance with claim 17 wherein the animation sequence comprises a sequence of moves.

26. A method in accordance with claim 17 wherein the animation sequence comprises a single move.

* * * * *